United States Patent [19]

Duck et al.

[11] Patent Number: 5,266,145
[45] Date of Patent: Nov. 30, 1993

[54] SEALANT AND ADHESIVE

[75] Inventors: Edward W. Duck, Leimen-Gauangelloch; Ingolf Scheffler, Wiesloch, both of Fed. Rep. of Germany

[73] Assignee: Teroson GmbH, Heidelberg, Fed. Rep. of Germany

[21] Appl. No.: 899,223

[22] Filed: Jun. 16, 1992

Related U.S. Application Data

[63] Continuation of Ser. No. 294,968, Jan. 5, 1989, abandoned, which is a continuation of Ser. No. 20,811, Mar. 3, 1987, abandoned.

[30] Foreign Application Priority Data

Mar. 5, 1986 [DE] Fed. Rep. of Germany ....... 3607172

[51] Int. Cl.$^5$ ............... C09J 167/02; C09J 175/04
[52] U.S. Cl. ............. 156/307.3; 156/331.4; 156/331.7; 525/123; 525/131
[58] Field of Search ............... 156/331.4, 331.7, 307.3

[56] References Cited

U.S. PATENT DOCUMENTS

| | | | |
|---|---|---|---|
| 2,970,119 | 1/1961 | Caldwell | 260/2.5 |
| 3,028,367 | 4/1962 | O'Brien | 525/131 |
| 4,020,216 | 4/1977 | Miller | 428/425 |
| 4,120,766 | 10/1978 | Riew | 204/157.78 |
| 4,182,898 | 1/1980 | Fujiwara et al. | 528/66 |
| 4,207,238 | 6/1980 | Gilles | 548/519 |
| 4,289,827 | 9/1981 | Noll et al. | 528/66 |
| 4,412,013 | 10/1983 | Chang | 521/121 |
| 4,716,070 | 12/1987 | Duck et al. | 428/192 |

FOREIGN PATENT DOCUMENTS

| | | |
|---|---|---|
| 87102803 | 1/1992 | European Pat. Off. . |
| 2015230 | 1/1987 | Japan ............ 156/331.7 |

Primary Examiner—Ana L. Carrillo
Attorney, Agent, or Firm—Ernest G. Szoke; Wayne C. Jaeschke; Real J. Grandmaison

[57] ABSTRACT

One-component, moisture-hardening sealants and adhesives contain telechelic isocyanate prepolymers obtainable by reacting diisocyanates and/or polyisocyanates in stoichiometric excess with polyester polyols, polyether polyols and hydroxy-functional (meth) acrylate prepolymers, as well as conventional plasticizers, the polyester polyols having branches, more particularly formed by alkyl radicals containing no functional groups. The polyester polyols can either be obtained by reacting corresponding branched diols and/or dicarboxylic acids or by subsequent grafting of side groups on to straight-chain polyester polyols. The sealants and adhesives are transparent or translucent, have a high ageing stability and excellent mechanical characteristics.

12 Claims, No Drawings

SEALANT AND ADHESIVE

This application is a continuation of application Ser. No. 07/294,968 filed on Jan. 5, 1989, which is a continuation of Ser. No. 07/020,811 filed Mar. 3, 1987, both now abandoned.

BACKGROUND OF THE INVENTION

1. Field of the Invention

The present invention relates to one-component sealants and adhesives hardening under the influence of moisture and based on low molecular weight, telechelic isocyanate prepolymers, whose backbone has a different chemical composition. The sealants and adhesives are preferably transparent or translucent.

Generally binary or ternary mixtures of polymers with different compositions are not compatible or have very wide miscibility gaps, i.e. only very small amounts of one component are soluble in the other component without phase separation (cf. e.g. H. G. Elias, Makromoleküle, p.211, Basle, Heidelberg, N.Y., 4th edition 1980). In general, only an insignificant improvement to the compatibility is obtained through adding solvents or plasticizers to incompatible mixtures.

For the synthesis of prepolymers containing isocyanate groups and used for producing polyurethane-based adhesives and sealants, very frequently use is made of polyether polyols or polyester polyols. Standard polyether polyols are di, tri or higher functional polypropylene glycols, polyethylene glycols or copolymers thereof. Frequently used polyester polyols are prepared by the esterification of aliphatic or aromatic dicarboxylic acids with difunctional or trifunctional alcohols.

Polyurethanes are frequently used in the formulation of sealants hardening at room temperature on the one hand because they have a high hardening speed, which can easily be controlled by catalysts and on the other hand during the hardening reaction, even in the case of one-component formulations, only very small amounts of volatile constituents are released, so that the shrinkage occurring during curing is very small. This makes it possible to produce very satisfactory low modulus sealants. A further advantage is their great absorbtivity for the standard and therefore inexpensive phthalate plasticizers. Therefore very advantageous sealants can be formulated economically.

A decisive disadvantage of polyether urethanes is their very high photooxidation sensitivity, which very considerably limits the use thereof in the open in sunlight. This more particularly applies to light coloured or unpigmented sealants. In the case of outdoor exposure or the laboratory simulation thereof, the latter are very rapidly photooxidatively decomposed, so that said sealants no longer fulfil their function. It is only possible to slightly slow down such decomposition processes by adding light stabilizers, antioxidants or combinations thereof, even if they are used in unusually high doses. For this reason it is not possible to produce technically usable, unpigmented (transparent or translucent) polyurethane sealants based on polyethers.

Polyurethane polymers based on polyester polyols admittedly have a much better resistance to photooxidative decomposition than polyether urethanes, so that at a first glance they would appear to be suitable. Polyester polyols and therefore the polyurethane prepolymers produced therefrom, for a comparable molecular weight range, have a much higher viscosity than the corresponding polyether polyols and the polyurethane prepolymers produced therefrom. Two routes can be taken in spite of this to come into the viscosity range necessary for using the sealants. Firstly a very low molecular weight polyester polyol, can be used as a raw material for producing polyurethane prepolymers. However, in order that the viscosity of the polyurethane prepolymer also remains low, i.e. there is no significant molecular weight increase during the production of the prepolymer, a very high weight percentage of diisocyanate or triisocyanate is required. A sealant formulated from such a prepolymer still contains a high percentage of reactive isocyanate groups in its reactive stage. In the case of formulations without latent hardeners, i.e. formulations whose crosslinking reaction is based on the partial hydrolysis of isocyanate groups to amino groups (Hofmann reaction) and their reaction with the remaining isocyanate groups, considerable carbon dioxide quantities are split off. In non-pigmented formulations, however, no absorbents can be used for the carbon dioxide, such as e.g. calcium oxide, so that bubble and foam formation supression is impossible.

When concomitantly using blocked amines as latent hardeners, it is admittedly possible to suppress bubble formation, but due to the high reactive isocyanate group percentage, a correspondingly high latent hardener quantity is required. As a result of the large number of urea groups formed after the hardening reaction, the cured sealant becomes very hydrophilic, which is not desired in most cases.

A second possibility of obtaining a low prepolymer viscosity and therefore sealant viscosity comprises diluting with large amounts of plasticizers or solvents. As the latter evaporates from the sealant during and after the curing process, this leads to an unacceptable shrinkage of the sealant following application. It is not possible to use in the quanitity necessary for an adequate viscosity reduction of the reactive polyester urethane prepolymer the less volatile higher phthalate plasticizers, such as di-2-ethyl hexyl phthalate, dinonyl phthalate, diisodecyl phthalate, etc., because following curing plasticizer exudation occurs. The reason for this phenomenon is the high polarity of the polyester backbone of the polymer, which can be attributed to the ester-carbonyl groups. The use of polar plasticizers, such as e.g. dibutyl phthalate is not possible as a result of its high volatility and the shrinkage link therewith.

One solution of the problem would be formed by the use of mixtures of polyether polyols and polyester polyols for the purpose of producing polyurethane prepolymers with a polyether and polyester backbone, so as to combine the advantages of the two components. However, this is not possible in connection with the production of one-component sealants, because the polyester polyols in question are not compatible with the polypropylene glycols suitable for prepolymer production and also not when mixed with plasticizers. A phase separation occurs even after short storage with a very fine dispersion of the two components. A "copolymer", obtained by the joint reaction of a polypropylene glycol and a polyester polyol with a diisocyanate, is also subject to macroscopic phase separation when stored under moisture exclusion conditions.

2. Discussion of Related Art

DE-C-29 15 864 describes a moisture-hardening, one-component sealant based on a free isocyanate group-containing reaction product of a diisocyanate and a hydroxyl group-containing acrylic acid ester copolymer of low molecular weight. However, technically high grade sealants are only obtained for pigmented formulations by this process and these can also only contain a small proportion of plasticizer, based on the polymer proportion.

According to an earlier proposal (German patent application P 35 18 708.5) mixtures of polyether polyols and a number of polyester polyols compatible with low molecular weight hydroxy-functional methacrylate polymers are obtained. The preferred polyether polyols are the known di, tri or higher functional polyalcohols known to the polyurethane Expert and which are obtained by polymerizing propylene oxide or by copolymerizing propylene oxide and ethylene oxide. The commercially available polyether polyols for producing polyurethanes in the molecular weight range up to approximately 10,000 are compatible in any ratio with the described hydroxy-functional low molecular weight acrylate and methacrylate polymers. Thus, it is readily possible by reaction with diisocyanates alone to prepare homogeneous prepolymer mixtures from these two components and to use these for formulating adhesives and sealants.

However, surprisingly advantageous overall characteristics of the sealants are obtained if the polymer mixture additionally contains a suitable polyester component. Only by means of this triple composition is it possible to obtain a non-rigid, unpigmented sealant system, which also has an adequate chemical resistance and light stability to permit use for external applications.

The problem of the invention is therefore to develop a compatible binder system, which permits the production of unpigmented, preferably transparent or translucent one-component sealants. Said one-component sealant must be stable during storage, whilst excluding atmospheric humidity and after the entry of the latter must rapidly cure to give a non-rigid sealing compound. This sealant must also have an adequate stability against photooxidative decomposition, so that it can be used outside without limitations.

DETAILED DESCRIPTION OF THE INVENTION

The present invention therefore relates to a one-component moisture-hardening sealant and adhesive based on telechelic isocyanate prepolymers obtainable by the reaction of diisocyanates and/or polyisocyanates in stoichiometric excess with polyester polyols, polyether polyols and optionally hydroxy-functional (meth) acrylate prepolymers, as well as optionally conventional plasticizers, which is characterized in that the polyester polyols have branches and either (i) correspond to the general formula I

in which m is an integer from 1 to 40 and A and B are divalent, aliphatic $C_2$ to $C_{20}$-radicals optionally containing an ester group or oxygen atoms in the chain, cycloaliphatic $C_6$ to $C_{20}$-radicals or aromatic $C_6$ to $C_{16}$-radicals, the radicals A and/or B in each case having at least two aliphatic $C_1$ to $C_5$-side groups, or A stands for the castor oil backbone, or B represents a C—C-bond or a methylene group or the backbone of a dimeric or trimeric fatty acid, or (ii) are a graft polymer of (meth)acrylates or vinyl compounds on a linear polyester polyol of general formula II

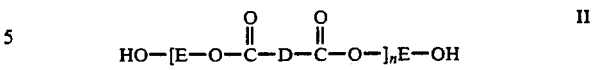

in which n is an integer from 1 to 40 and D and E are in each case straight-chain aliphatic $C_2$ to $C_{20}$-radicals optionally containing oxygen atoms in the chain, or D is a C—C-bond or a methylene radical. The sealant and adhesive can optionally also contain fillers, pigments, thixotropic agents, anti-agers and catalysts, as well as conventional additives. The materials are, however, preferably formulated as transparent or translucent mixtures. Mixtures of polypropylene glycols and low molecular weight hydroxy-functional (meth) acrylate prepolymers according to German patent application P 35 18 708.5 are miscible with one another in any ratio. It has surprisingly been found that on admixing the aforementioned branched polyester polyols in the presence of plasticizers, once again compatible polymer mixtures are obtained.

The polyester polyols of formulas I and II can be synthesized by per se known processes from the corresponding difunctional alcohols in the necessary stoichiometric excess and dicarboxylic acid. Their molecular weight is 300 to 15,000 and preferably 500 to 5,000.

Examples of suitable branched alcohols are 2,2,4-trimethyl hexane diol, 2,2,4-trimethyl pentane diol, 2,2-dimethyl propane diol, castor oil, isomer mixtures of 1,2, 1,3 or 1,4-bis(hydroxymethyl)cyclohexane, 3-hydroxy-2,2-dimethyl propionic acid-3-hydroxy-2,2-dimethyl propyl ester (as an example of a diol with an ester group in the chain) and dimeric or polymeric fatty alcohols, such as are described on p.3 ff of DE-A- 16 94 957. Per DE-A-16 94 957, polyurethane is prepared by reaction of a polyisocyanate with a dihydric alcohol containing polyester of a homo- or copolymeric fatty alcohol. Examples of unbranched diols, which are reacted with branched dicarboxylic acids, are ethylene glycol, 1,2 or 1,3-propane diol, 1,4-butane diol, hexane diol, decane diol and diethylene glycol.

Suitable unbranched dicarboxylic acids for reaction with branched diols are oxalic, malonic, glutaric, adipic, sebacic, suberic or higher dicarboxylic acids. For reaction with unbranched alcohols are suitable branched dicarboxylic acids, such as dimethyl malonic acid, diethyl malonic acid, 3,3-dimethyl glutaric acid, 1,2, 1,3 or 1,4-cyclohexane dicarboxylic acid and dimerized or trimerized fatty acid. It is optionally possible to react branched dicarboxylic acids with branched diols to the polyester polyol, it then being sufficient if each of the components has at least one side group. In all there must be at least two side groups for one diol and one dicarboxylic acid.

The polyester polyols of formula II as such do not yet have a branch. Examples for such simple starting polyols of formula II are esterification products of ethylene glycol, diethylene glycol, propylene glycol, butane diol or mixtures thereof with malonic, glutaric, adipic, sebacic or suberic acid or mixtures of these acids. The branches are obtained by a radical graft reaction and are statistically distributed over the polymer chain. Generally the branches carry no functional groups which can react with isocyanate groups. Examples for monomers to be grafted on are styrene, isoprene, butadiene, $C_1$ to $C_{12}$-alkyl esters of acrylic acid or methacrylic acid and mono or di-$C_1$- to $C_{12}$-alkyl esters of maleic acid or itaconic acid.

The graft reaction can be performed as a separate reaction, so that the desired branched polyester polyol is obtained which, as will be described hereinafter, is then converted into a polyurethane prepolymer by reacting with an isocyanate.

However, according to a preferred embodiment, a hydroxy group-containing low molecular weight acrylate or methacrylate polymer is polymerized in a "one pot reaction" (same vessel) in the presence of a polyester polyol of formula II. The polymerization of the acrylate or methacrylate monomer can take place according to the process described in application P 35 18 708.5. Low molecular weight (meth) acrylate polymers with substantially $\alpha,\omega$-terminal hydroxyl groups with a hydroxyl group equivalent weight of 500 to 5,000 are obtained by polymerizing (meth) acrylates and optionally copolymerizable monomers in the presence of an initiator able to transfer hydroxyl groups to the polymer molecule and regulators of general formula HO—A—$S_x$—B—OH, in which A and B in each case stand for a divalent organic radical and $X \geq 2$. According to the process known from the general literature, e.g. of DE-C-29 15 864, the molecular weight is controlled by a hydroxyl group-containing mercaptan, such as mercaptoethanol as the regulator and if necessary, additionally a hydroxyl group-containing monomer, such as 2-hydroxy ethyl-(meth) acrylate. Per DE-C-29 15 864 (equivalent to U.S. Pat. No. 4,259,231) it is disclosed that acrylic low molecular weight copolymer is produced by copolymerizing (a) an ethylenically unsaturated monomer having a functional group capable of reacting with an organic diisocyanate compound with an unsaturated monomer in the presence of a polymerization initiator having a functional group and/or a chain transfer agent. It is also stated therein that the chain transfer agent may be 2-mercaptoacetic acid, 2-mercaptoethanol, 2-aminoethane thiol and trichloroacetic acid which is used in an amount so that one functional group on average participates in the (polymerization) reaction with the organic diisocyanate compound and the degree of polymerization of the polymer is suitable, i.e., the polymer preferably has a number average molecular weight of about 3,000 to 70,000.

The mixtures of polyester polyols and low molecular weight hydroxy-functional functional (meth) acrylate polymers prepared according to this one pot process are viscous, clear or sometimes opaque or slightly cloudy liquids. No phase separation of the latter was observed. By adding commercially available plasticizers, such as e.g. phthalates in quantities necessary for sealant formulation, clear, low to medium viscous, colourless liquids are obtained, which are compatible in any ratio with the standard polyurethane chemistry polyether polyols. These ternary polyol mixtures with plasticizers are in turn clear liquids and can be reacted in per se known manner with diisocyanates or polyisocyanates to isocyanate group-containing polyurethane prepolymers.

Besides this "integral" production procedure for isocyanate group-containing polyurethane prepolymers, in which a mixture of all three different polyol components is reacted with the diisocyanate, each individual polyol component can be reacted with the isocyanate. In the presence of the plasticizer quantity necessary for sealant production, the thus produced individual isocyanate group-containing prepolymers are fully compatible with one another.

Suitable polyether polyols for the polyol component are in particular polyethylene oxide, polypropylene oxide and their copolymers. Mixtures of polyether polyols with branched polyester polyols can in certain circumstances be compatible with one another, e.g. when using polyester polyols based on oligomeric fatty acids or fatty alcohols or diols with an ester group in the chain. However, preference is generally given to a ternary polyol mixture, which additionally contains a hydroxy-functional (meth) acrylate.

In principle, any diisocynate or polyisocyanate can be used for preparing the telechelic isocyanate group-containing prepolymers. As the preferred uses for these prepolymers according to the invention are unpigmented or light pigmented sealants, preference is given to the use of light-stable, aliphatic or cyclo-aliphatic isocyanates. Typical examples of suitable diisocyanates are hexamethylene diiosocyanate (HDI), 2,2,4-trimethyl hexane diisocyanate, 3-isocyanato-methyl-3,5,5-trimethyl cyclohexyl isocyanate (IPDI), trans-1,4-cyclohexane diisocyanate (CHDI), 1,3-bis(isocyanato methyl)cyclohexane ($H_6$XDI), 4,4'-dicyclohexyl methane diisocyanate ($H_{12}$MDI), meta-tetramethyl xylene diisocyanate or para-tetramethyl xylene diisocyanate (m-TMXDI, p-TMXDI). For the purpose of preparing pigmented sealants, it is also possible to use aromatic compounds, such a diphenyl methane diisocyanate (MDI), toluene diisocyanate (TDI), naphthalene diisocyanate, p-phenylene diisocyanate and 1,3-bis (isocyanato-methyl)-benzene.

The reaction of the polymers containing the individual hydroxyl groups or the polymer mixture containing the hydroxyl groups with the isocyanate to give the polyurethane prepolymer can either take place at room temperature or at elevated temperature between 50° and 100° C. in per se known manner, the known catalysts such as tin (II)octoate being addable for accelerating the reaction. Further examples are provided inter alia in J. H. Saunders and K. C. Fritsch, Polyurethanes—Chemistry and Technology, Part I, pp.129-217, New York, 1962. Although, for the reasons indicated hereinbefore, the reaction normally takes place in the presence of plasticizers, it can also take place "in substance". Examples of plasticizers are esters of phthalic, adipic or sebacic acid, but phosphate ester or sulphonate plasticizers can also be used.

Generally 1.5 to 2 isocyanate equivalents of the diisocyanate are used per hydroxyl equivalent of the polyol component and the reaction is continued until all hydroxyl groups have reacted away (measured by the reduction of the isocyanate groups). The polyester polyol content of the polyol component can be 2 to 80 and preferably approximately 20 to 40% by weight.

The moisture-hardening adhesives and sealants based on the isocyanate group-containing compatible prepolymer mixtures prepared according to the invention contain, in addition to conventional plasticizers, optionally suitable fillers, thixotropic agents, anti-agers, coupling agents, hardening catalysts and hardeners, e.g. latent amine hardeners.

The latter can be blocked diamines or polyamines, e.g. the enamines referred to in DE-B-21 16 882, DE-B-21 25 247, DE-B-25 21 841 and DE-B-21 66 502 as well as the oxazolidines referred to in DE-B-24 46 438 and the aldimines or ketimines referred in GB-A-10 64 841 or DE-A-33 06 373.

For the purposes of the preferred transparent or translucent sealants according to the invention, it is only possible to use fillers which are very finely divided and/or have a similar refractive index to the prepolymer mixture. Examples of suitable fillers are highly disperse silicic acids, very finely divided glass powder or glass fibres, very finely divided polymethyl methacrylate powders, very finely divided polystyrene powders or very finely divided powders of copolymers of methyl methacrylate and other methacrylates, acrylonitrile and/or styrene. Selection criteria are the particle freedom of the glass or polymer powder and the similarity of the refractive index with that of the prepolymer mixture. In the case of a substantially identical refractive index, the filler can have an average particle size of up to 400 μm. Otherwise the average particle size should not exceed 40 to 50 μm.

In connection with the transparent or translucent sealant compositions according to the invention, it is important to stress the good balance of the technically important characteristics, such as good transparency, good weathering resistance and in particular stability to photooxidative decomposition, low modulus of elasticity, good recovery capacity after elongation, together with the very limited amount of smell given off during curing.

Compared with the sealants based on silicone oligomers preferably used outside, the polymer mixtures according to the invention offer important advantages, i.e. the elongation at break and tear propagation strength are much higher, which is of decisive importance when sealing gaps, which are subject to considerable internal diameter variations as a result of thermal expansion or mechanical movement. The water vapour permeability of the sealants according to the invention is only a third of that of sealants based on silicone oligomers, which can be advantageously used in connection with sealing problems, where it is a question of a good water vapour barrier. A further advantage is the possibility of using the economically favourable phthalate plasticizer. This is only possible to a limited extent in the case of silicone sealants, particularly those of the unpigmented type, where it is generally necessary to use the very extensive polymeric plasticizers based on low molecular weight silicone oils. Thus, considerable cost savings result.

The following typical examples show the technical advantages of the polymer mixtures according to the invention and the sealants formulated therefrom, but do not cover the complete range of uses of the sealants or adhesives according to the invention, but the Expert can easily derive this from the above information.

The parts and percentages given in the examples are parts and percentages by weight. The given hydroxyl equivalent weights (E(OH)) are determined by acetylation with acetic anhydride and titration with potassium hydroxide, whilst the isocyanate equivalent weights (E(NCO)) were determined by the dibutyl amine method. The indicated average molecular weights (M(GPC)) were determined by gel permeation chromatography and constitute uncorrected peak values (calibrated against the polystyrene standard). The viscosities were determined at 20° C. using a Brookfield viscosimeter.

EXAMPLE 1

Preparation of Polyester Polyols of Formula I

The following polyester polyols were synthesized according to conventional esterification processes, for which purpose the particular alcohol and carboxylic acid components were mixed in xylene, mixed with an acid ion exchanger and refluxed to boiling. The resulting reaction water was azeotropically removed, at the end of the reaction filtration took place from the ion exchange resin and the solvent and optionally the alcohol component used in excess were distilled off in vacuo.

Condensation Product Of

Polyester 1 m.w. 2500: Adipic acid with diethylene glycol (comparison)

Polyester 2 m.w. 2000: Adipic acid with ethylene glycol, diethylene glycol and 1,4-butane diol (comparison)

Polyester 3 m.w. 2000: Dimerized fatty acid with ethylene glycol

Polyester 4 m.w. 1000: Adipic acid with neopentyl glycol

Polyester 5 m.w. 2000: As polyester 4

Polyester 6 m.w. 2000: Dimethyl glutaric acid with ethylene glycol

Polyester 7 m.w. 2000: Adipic acid with dimeric fatty alcohol

Polyester 8 m.w. 1500: Dimethyl malonic acid with ethylene glycol

Polyester 9 m.w. 2000: Adipic acid with 1,4-bis(hydroxy methyl)cyclohexane

Polyester 10 m.w. 1200: Ricinoleic acid with glycerol and 1,4-butane diol

Polyester 11 m.w. 1800: Adipic acid with 3-hydroxy-2,2-dimethyl propionic acid-3-hydroxy-2,2-dimethyl propyl ester Polyester 12 m.w. 1900: Adipic acid, glutaric acid and succinic acid with diethylene glycol (comparison)

EXAMPLES 2 to 4

Grafting of Polyester Polyols of Formula II

The following polyesters were provided with side chains by radical graft reaction and simultaneously the low molecular weight hydroxy-functional methacrylate polymer was produced in situ.

(2) 115 parts of polyester 1 were heated to 80° C. in a four neck flask with stirrer, reflux condenser and three dropping funnels, the apparatus was evacuated several times and scavenged with nitrogen. Then, within 10 minutes half a solution of 10.2 parts of hydroxy ethyl methacrylate ran into 100 parts of n-butyl methacrylate (monomer) in the reaction flask. Subsequently, within a 70 minute period, the remaining monomer, a solution of 0.42 parts of azobisiso butyro nitrile in 46 parts of ethyl acetate and 4.88 parts of mercapto ethanol was simultaneously dosed from the dropping funnels. The temperature was then slowly raised to 100° C. and stirring took place at this temperature for a further 5 hours. After cooling, 57.65 parts of dioctyl phthalate (DOP) were added and the ethyl acetate was distilled off in vacuo. The slightly opaque polymer solution now contained 20% DOP.

(3) and (4): polyesters 2 and 12 were reacted in the same way.

COMPARISON EXAMPLES 5 to 8

(5) 150 parts of isopropanol, 20 parts of water, 0.004 parts of iron(II)-sulphate, 0.04 parts of ethylene diamine tetraacetic acid and 0.6 parts of 70% perchloric acid were placed in a four neck flask with reflux condenser, stirrer, internal thermometer and two feed boxes, freed from dissolved oxygen and heated to 80° C. in a nitrogen stream. Of the 300 parts of n-butyl methacrylate, 5% were now added all at once to the reaction flask and then within 10 minutes 55 parts of 60% aqueous hydrogen peroxide solution dripped into said flask. Following the quietening down of the exothermic reaction, the remaining monomer and a solution of 13 parts of bis(hydroxy ethyl) disulphide in 50 parts of isopropanol were dosed in within 5 hours. This was followed by stirring for 2 hours at 75° C. After cooling the polymer solution was mixed with 500 ml of toluene and the separating aqueous phase was removed. The organic phase was washed four times with saturated aqueous sodium disulphite solution and then with water. The slightly cloudy polymer solution was filtered clear and the solvent distilled off in vacuo. The yield of highly viscous, clear, colourless polymer was almost quantitative. E(OH)=3.450 g/mol, M(GPC)=3.650.

25 parts of this hydroxy-functional methacrylate, 25 parts of a trifunctional propylene oxide-ethylene oxide copolymer of m.w. 4900 (polyether polyol) and 25 parts of DOP were mixed homogeneously and degassed, giving a clear, colourless solution, but which contained no polyester polyol.

(6) 25 parts of polyester 1, 25 parts of the above polyether polyol and 25 parts of DOP were mixed and degassed, the very cloudy solution revealing phase separation after 3 days.

(7) and (8): polyester 1 was replaced by polyesters 2 or 12, giving very cloudy solutions, which revealed phase separation after 3 days.

EXAMPLES 9 TO 17

25 parts of polyester polyols 3 to 11 were mixed with in each case 25 parts of the hydroxy-functional methacrylate of example 5, 25 parts of polyether polyol and 25 parts of DOP and degassed. In all cases clear solutions were obtained.

EXAMPLES 18 TO 20

60 parts of the methacrylate/polyester mixtures of examples 2 to 4 were mixed with in each case 24 parts of polyether polyol and 20 parts of DOP, followed by degassing. Clear solutions were obtained.

EXAMPLE 21

1730 parts of a trifunctional copolymeric polyether polyol of propylene oxide and ethylene oxide with a E(OH) of 1650 g/mol was heated under nitrogen to 50° C. in a three neck flask with reflux condenser, internal thermometer and stirrer. Then 240 parts of IPDI were added accompanied by stirring, followed by 0.075 parts of tin(II) octuate (catalyst) in 0.375 parts of dry toluene and the mixture was heated to 80° C. Following a 9 hour reaction time, complete reaction was obtained and the isocyanate group-containing prepolymer was cooled to room temperature. E(NCO)=1910 g/mol, viscosity:37,000 mPa.s.

EXAMPLE 22

499 parts of polyester 4 (E(OH)=518 g/mol) and 216.2 parts of IPDI were reacted as in example 21. At the end of the reaction the E(NCO) was 785 g/mol, viscosity 2 350 000 mPa.s.

EXAMPLE 23

1033 parts of polyester 2 (E(OH)=1000 g/mol) and 212 parts of IPDI were reacted as in example 21. At the end of the reaction, 140 parts of xylene had to be added to lower the viscosity, the E(NCO) was then 1450 g/mol and the viscosity 40,000 mPa.s.

EXAMPLE 24

An isocyanate group-containing butyl methacrylate prepolymer according to example 5 was prepared, the E(NCO) being 2286 g/mol and the viscosity 562,000 mPa.s.

EXAMPLE 25

An "integral" prepolymer mixture comprising 532.8 parts of hydroxy-functional butyl methacrylate with an E(OH) of 821 g/mol as in example 5, 796.4 parts of a trifunctional polypropylene oxide with an E(OH) of 1650 g/mol and 642.4 parts of polyester polyol 4, 621.9 parts of DOP, 483 parts of IPDI and 0.13 parts of tin(II) octoate were synthesized as in example 21, giving an E(OH) of 1840 g/mol and a viscosity of 115,000 mPa.s.

COMPARISON EXAMPLE 26

330 parts of a hydroxy-functional butyl acrylate as in example 1 of DE-C-29 15 864 (E(OH)1996 g/mol) and 27.5 parts of an isomer mixture of diisocyanatotoluylene(TDI) were reacted as described in example 21, E(NCO)=2712 g/mol, viscosity 427,000 mPa.s.

EXAMPLES 27 TO 32

The mixtures referred in table 1 were prepared in a planetary mixer. The DOP to polymer ratio of the particular formulation was optimized for its use as a sealant. The proportion of oxazolidine hardener according to DE-B-24 46 438 was adapted to the particular stoichiometric requirements, whilst the AEROSIL proportion and anti-ager proportion were kept the same. The individual compositions and their characteristics are given in table 1.

TABLE 1

| | | Example | | | | | |
|---|---|---|---|---|---|---|---|
| | | 27 | 28 | 29 | 30 | 31 | 32 |
| Prepolymer of example | 21 | 64.0 | — | — | — | 13.4 | — |
| | 22 | — | — | — | — | 13.4 | — |
| | 23 | — | 50.0 | — | — | — | — |
| | 24 | — | — | — | — | 13.4 | — |
| | 25 | — | — | — | — | — | 40.2 |
| | 26 | — | — | 40.7 | 44.5 | — | — |
| Oxazolidine[1] | | 6.0 | 7.0 | 3.8 | — | 4.4 | 4.4 |
| DOP | | 19.5 | 32.5 | 45.0 | 45.9 | 44.9 | 44.9 |
| Anti-ager[2] | | 1.0 | 1.0 | 1.0 | 1.0 | 1.0 | 1.0 |
| AEROSIL 200[3] | | 9.5 | 9.5 | 9.5 | 9.5 | 9.5 | 9.5 |
| Tensile strength according to DIN 53504 | | | | | | | |
| 100% modulus (N/cm$^2$) | | 46 | — | — | — | 38 | 41 |
| Tensile strength (N/cm$^2$) | | 85 | — | — | — | 179 | 206 |
| Elongation at break % | | 216 | — | — | — | 450 | 380 |
| Observations | | | WM-Exudation-Not storage stable Pronounced bubble formation | | | | |
| Tensile strength after 1000 hours, QUV ageing according to ASTM G 53-77 | | | | | | | |
| 100% modulus (N/cm$^2$) | | — | — | — | — | 32 | 39 |
| Tensile strength (N/cm$^2$) | | — | — | — | — | 114 | 127 |
| Elongation at break (%) | | — | — | — | — | 383 | 325 |

[1] Bisoxazolidine according to DE-B- 24 46 438
[2] Ciba Geigy mixture of commercial anti-agers
[3] Degussa pyrogenic silicic acid The tensile strength of example 27 could not be determined following UV-ageing, because the material was completely depolymerized (smeary highly viscous material). Example 28 could not be evaluated, because there was marked plasticizer exudation. Example 29 gave a completely unacceptable storage stability and example 30 was completely penetrated by bubbles following curing. However, the inventive compositions of examples 31 and 32 gave excellent results.

EXAMPLE 33 and 34

50×50×5 mm glass plates were coated on one side with a silane-containing primer solution and then using spacers a 10×10×50 mm cavity between the glass plates was filled with sealant and this was cured for three weeks under normal climatic conditions of 23° C. and 55% relative atmospheric humidity. For comparison purposes, a commerically available, amine-hardening, transparent silicone sealant was cured in the same way. After a few days the spacers were removed. The glass plate/sealant sandwich then wnderwent a tensile test and the results are give in table 2.

TABLE 2

| Sealant | No. 31 | Silicone |
|---|---|---|
| 100% modulus (N/cm$^2$) | 19 | 34 |
| Tensile strength (N/cm$^2$) | 50 | 37 |
| Elongation at break (%) | 335 | 128 |
| Type of break | Cohesive | Cohesive |

Compared with the commerically available silicone sealant, the inventive sealant has a lower 100% modulus, a higher tensile strength and a higher elongation at break.

We claim:

1. A method of sealing a space separating adjacent surfaces or of adhesively joining two surfaces together comprising applying to at least one of the surfaces a one-component, moisture-hardening sealant or adhesive composition consisting essentially of a telechelic isocyanate prepolymer prepared by reacting a polyisocyanate in stoichiometric excess with a branched polyester polyol, a hydroxy-functional (meth)acrylate prepolymer, and a polyether polyol, wherein said polyester polyol corresponds to formula I:

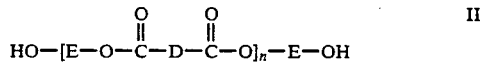

in which m is an integer from 1 to 40 and A and B are divalent, aliphatic C$_2$ to C$_{20}$-radicals, aliphatic C$_2$ to C$_{20}$ radicals containing an ester group or oxygen atoms in the chain, cycloaliphatic C$_6$ to C$_{20}$-radicals or aromatic C$_6$ to C$_{16}$-radicals, or A is castor oil backbone, or B is a carbon-carbon bond or a methylene group or the backbone of a dimeric or trimeric fatty acid, said radicals A or B having at least two aliphatic C to C-side groups, and causing said sealant or adhesive composition to harden by exposing it to moisture.

2. A method as in claim 1 wherein said telechelic isocyanate prepolymer is prepared in the presence of a plasticizer.

3. A method as in claim 1 wherein said isocyanate prepolymer is prepared by separately reacting each of said polyester polyol, polyether polyol and hydroxy-functional (meth) acrylate prepolymer with said polyisocyanate followed by mixing together the products thereof.

4. A method as in claim 1 wherein said polyester polyol has a molecular weight of 300 to 15,000.

5. A method as in claim 1 wherein said polyester polyol has a molecular weight of 500 to 5,000.

6. A method as in claim 1 wherein the proportion of said branched polyester polyol is 2 to 80% by weight, based on the weight of the total mixture of said isocyanate prepolymers.

7. A method of sealing a space separating adjacent surfaces or of adhesively joining two surfaces together comprising applying to at least one of the surfaces a one-component, moisture-hardening sealant or adhesive composition consisting essentially of a telechelic isocyanate prepolymer prepared by reacting a polyisocyanate in stoichiometric excess with a polyester polyol, a hydroxy-functional (meth) acrylate prepolymer, and a polyether polyol, wherein said polyester polyol consists essentially of a graft polymer selected from the group consisting of styrene, isoprene, butadiene, C$_1$-C$_{12}$ alkyl esters of acrylic acid and methacrylic acid and mono- or di-C$_1$-C$_{12}$ alkyl esters of maleic acid or itaconic acid on a linear polyester polyol corresponding to formula II:

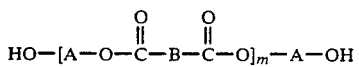

in which n is an integer from 1 to 40 and D and E are straight-chain aliphatic C$_2$ to C$_{20}$-radicals, straight-chain aliphatic C$_2$ to C$_{20}$-radicals containing oxygen atoms in the chain, or D is a carbon-carbon bond or a methylene radical, and causing said sealant or adhesive composition to harden by exposing it to moisture.

8. A method as in claim 7 wherein said telechelic isocyanate prepolymer is prepared in the presence of a plasticizer.

9. A method as in claim 7 wherein said isocyanate prepolymer is prepared by separately reacting each of said polyester polyol, polyether polyol and hydroxy-functional (meth) acrylate prepolymer with polyisocyanate, followed by mixing together the products thereof.

10. A method as in claim 7 wherein said polyester polyol has a molecular weight of 300 to 15,000.

11. A method as in claim 7 wherein said polyester polyol has a molecular weight of 500 to 5,000.

12. A method as in claim 7 wherein the proportion of said polyester polyol is 2 to 80% by weight, based on the weight of the total mixture of said isocyanate prepolymers.

* * * * *